United States Patent [19]
Schmidt

[11] Patent Number: 5,133,565
[45] Date of Patent: Jul. 28, 1992

[54] EXPANDING COLLET

[76] Inventor: Claus Schmidt, Wilhelmshofstrasse 34, 7120 Bietigheim-Bissingen, Fed. Rep. of Germany

[21] Appl. No.: 656,300

[22] Filed: Feb. 15, 1991

[30] Foreign Application Priority Data

Feb. 16, 1990 [DE] Fed. Rep. of Germany ....... 4004819

[51] Int. Cl.$^5$ .............................................. B23B 5/22
[52] U.S. Cl. ................................ 279/2.04; 279/901; 82/169
[58] Field of Search ............... 279/2 R, 1 Q, 1 ME, 279/58, 51, 65, 96; 82/169

[56] References Cited

U.S. PATENT DOCUMENTS

| | | | |
|---|---|---|---|
| 1,807,264 | 5/1931 | Walker | 279/58 X |
| 1,808,288 | 6/1931 | Chapman et al. | 279/51 |
| 2,270,661 | 1/1942 | Montgomery | 279/51 |
| 2,459,899 | 1/1949 | Stoner | 279/51 |
| 2,817,532 | 12/1957 | Hohwart et al. | 279/1 ME |
| 3,332,693 | 7/1967 | Armstrong et al. | 279/51 |
| 3,909,021 | 9/1975 | Morawski et al. | 279/2 R |
| 4,121,847 | 10/1978 | Morawski | 279/2 R |
| 4,391,451 | 7/1983 | Secor et al. | 279/2 A |
| 4,416,459 | 11/1983 | Morawski et al. | 279/2 R |

FOREIGN PATENT DOCUMENTS

| | | |
|---|---|---|
| 1938321 | 3/1970 | Fed. Rep. of Germany . |
| 2612694 | 10/1976 | Fed. Rep. of Germany . |
| 2831140 | 1/1980 | Fed. Rep. of Germany . |
| 3629722 | 3/1988 | Fed. Rep. of Germany . |

OTHER PUBLICATIONS

Von II. Frick; Lamellenspannzeuge; Feb. 1969; pp. 89-90.

Primary Examiner—Larry I. Schwartz
Assistant Examiner—R. Schultz
Attorney, Agent, or Firm—Robert W. Becker & Associates

[57] ABSTRACT

A collet chuck with a collet body having radially extending clamping parts with counter guiding surfaces that are cooperating with the guiding surfaces of a corresponding mandrel is provided. The guiding surfaces are formed as planar sections of the mandrel and are arranged in a common plane with the counter guiding surfaces.

5 Claims, 5 Drawing Sheets

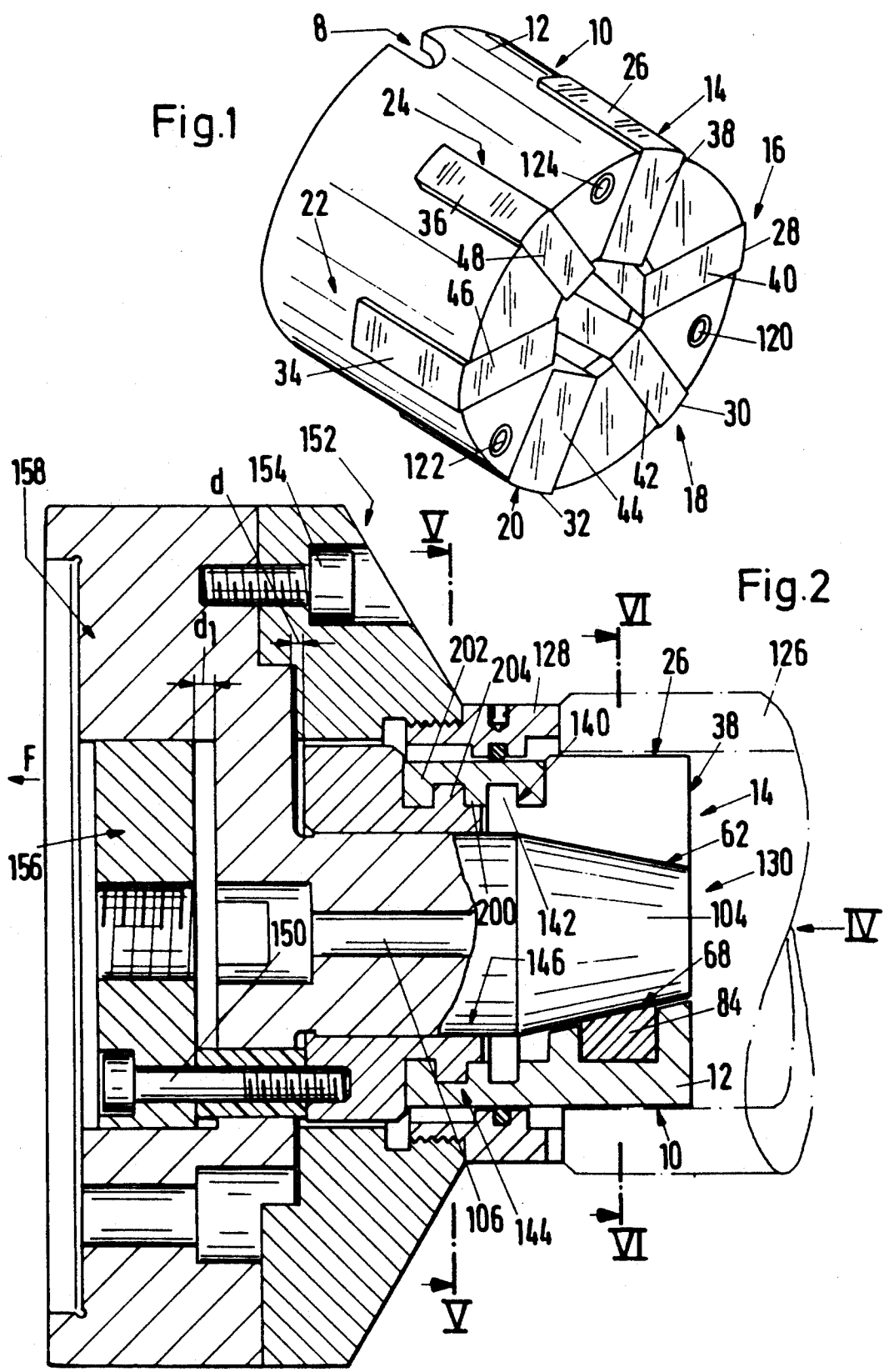

EXPANDING COLLET

BACKGROUND OF THE INVENTION

The present invention relates to an expanding collet chuck having radially extending clamping parts with counter guiding surfaces, whereby the clamping parts cooperate with a mandrel having guiding surfaces.

Expanding collet chucks of the aforementioned kind connect the tool with the tool holder during machining steps. They usually not only provide support for the working forces, but also automatically adjust. i.e., center the tool during the clamping process into a certain position that is necessary for a machining process with satisfactory results. A collet chuck is always usable for different shapes and dimensions of tools within a certain range. For turning and grinding or polishing of outer surfaces of tools, the tools are clamped with their semi-finished or finished bores onto the collet chuck. The clamping force acts radially from the inside to the outside. The collet body several receiving cutouts that are arranged equally spaced about its circumference, having arranged therein wedge-shaped, flat clamping parts, that are radially adjustable in the receiving cutouts. The mandrel which has a circular cross-section is moved towards the inside during clamping and thereby presses, due to its conical shape, the clamping parts that are connected to one another via holding springs toward the outside. This arrangement, however, allows only for little truth of concentricity.

It is therefore an object of the present invention to provide a collet chuck of the aforementioned kind with which a truth of concentricity with a deviation of less than $10^{-2}$ mm may be achieved.

SUMMARY OF THE INVENTION

The collet chuck of the present invention is primarily characterized by a mandrel provided with guiding surfaces in the form of planar sections which are arranged in a common plane with the corresponding counter guiding surfaces of the clamping parts.

The collet chuck comprises a collet body having radially extending receiving cutouts, the inner walls of which are facing one another and are arranged in parallel, whereby the width of the receiving cutouts corresponds to the width of the clamping parts. The clamping parts, if loaded in a radial direction may move radially inwardly or outwardly. By arranging the planar guiding surfaces in a common plane with the counter guiding surfaces, it is ensured, that the guiding surfaces that are facing one another are in contact with one another over a maximum surface area. The wear of the guiding surfaces and the contact guiding surfaces is therefore reduced to a minimum. All forces acting on the clamping parts are therefore radially oriented.

Further expedient and advantageous embodiments of the present invention are disclosed in the following paragraphs.

In a collet chuck with a pull member, it is advantageous that the stationary mandrel narrows in the direction of its free end and that the pull member be connectable to the collet chuck in an operating manner. It is preferable that the clamping parts of the collet chuck are provided in the form of lamellas.

The mandrel is therefore arranged in a stationary manner, while the adjusting movements are carried out by the collet body, so that inaccuracies that have been known to occur with conventional collet chucks of the aforementioned kind when moving the mandrel will not occur with the collet chuck of the present invention.

In a further advantageous embodiment the receiving cutouts for the clamping parts are provided with widened portions that are filled with elastically deformable holding parts for connecting the clamping parts with the collet body. It is preferable that the widened portions are filled with rubber or plastic materials and that the holding parts are forcing the collet chuck radially inwardly. In the resting position of the collet chuck, the clamping parts are therefore arranged in the collet body.

In another embodiment of the present invention the receiving cutouts are open towards the interior of the collet body, whereby the clamping parts are connectable to the collet body via coupling elements. These measures may be realized such that the coupling elements are formed as radially extending cogs of the clamping parts that engage the receiving cutouts of the collet body. The receiving cutouts and the cogs are dimensioned such that they do not influence the exactness of the radial adjustment of the clamping parts.

In a further advantageous embodiment the collet chuck and the pull member are connected via a bayonet locking device such that they may be disengaged. Due to the bayonet locking device a simple and fast operating connection between the collet chuck and the spindle head is possible.

In another embodiment of the present invention the collet chuck is provided with a catching cutout which is engaged by a catch of the spindle cutout which is engaged by a catch of the spindle head in an operating manner. The catching cutout may be arranged at the face of the collet body that is facing away from the tool to be inserted into the collet chuck.

In a further preferable embodiment the mandrel is provided with an axial bore and a radially recessed portion. An actuating mechanism of the catch is disposed in the bore and the recessed portion. The actuating mechanism is loaded by a spring thus forcing the catch into its catching position with the catching cutout. The catch ensures that an accidental unlocking of the operating connection between the spindle head and the collet chuck is prevented.

In order to be able to remove the collet chuck from the spindle head, a further embodiment provides an unlocking device for cooperation with the actuating mechanism that is accessible from the free end of the collet body. The unlocking device is provided with an axially extending bolt for axially adjusting the actuating mechanism. The bolt engages the axial boring of the mandrel.

The bolt cooperates with a pressure spring which is loaded such that it forces the bolt away from the actuating mechanism.

BRIEF DESCRIPTION OF THE DRAWINGS

This object and other objects and advantages of the present invention will appear more clearly from the following specification in conjunction with the accompanying drawings, in which:

FIG. 1 is a perspective side view of a collet chuck;

FIG. 2 shows a collet chuck resting on a spindle head in a cross-sectional view along the center axis;

DESCRIPTION OF PREFERRED EMBODIMENTS

Figure 6:
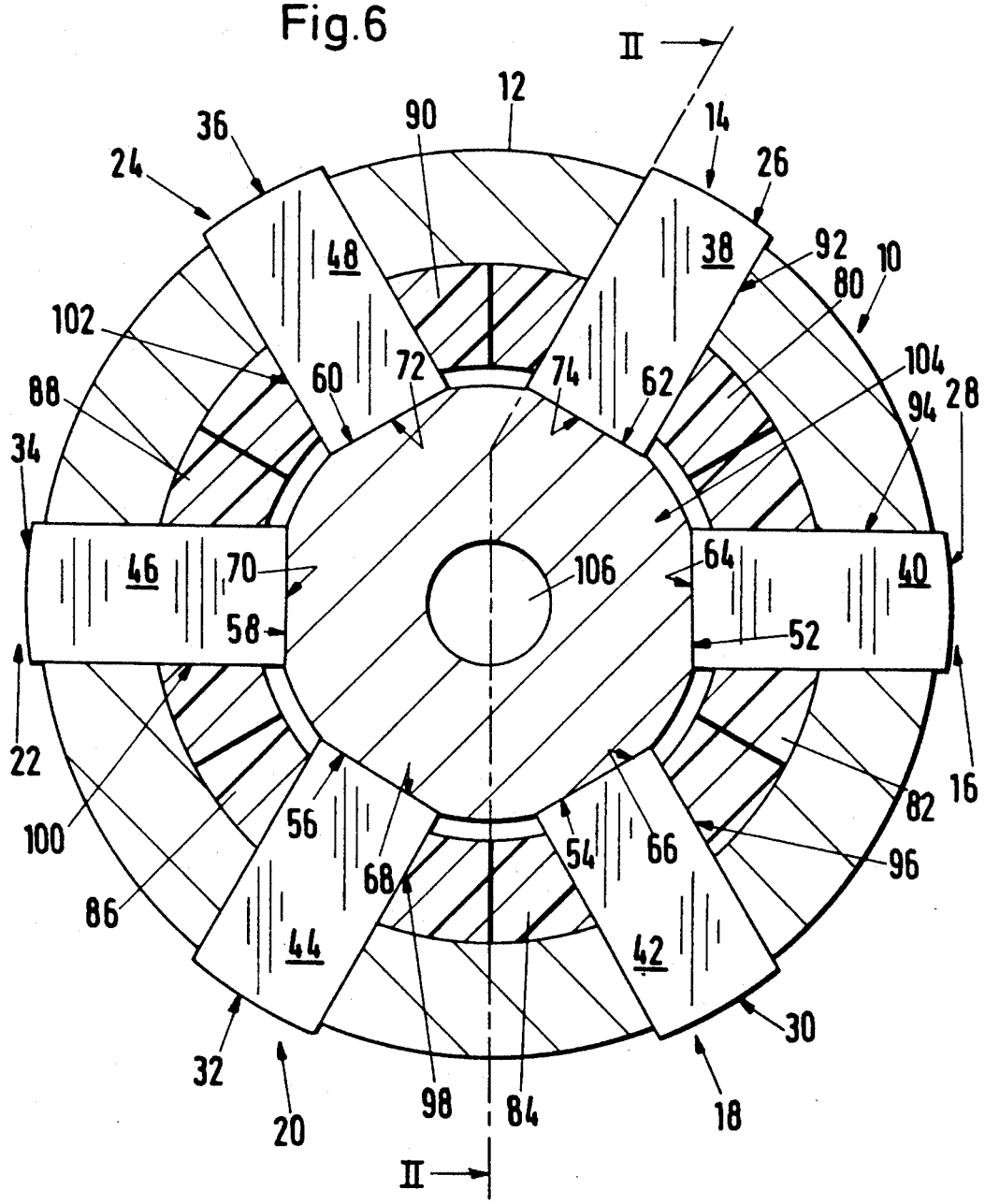
FIG. 6 shows a cross-sectional view along the lines VI—VI of FIG. 2.

The drawings represent a collet chuck 10 having a collet body 12 with radially extending clamping parts 14 to 24 provided with counter guiding surfaces 52 to 62, whereby the clamping parts 14 to 24 cooperate a mandrel 104 with guiding surfaces 64 to 74 (FIG. 6). The guiding surfaces 64 to 74 are embodied as planar sections of the mandrel 104, which are arranged in a common plane with the corresponding counter guiding surfaces 52 to 62. The radially outwardly facing sides 26 to 36 of the clamping parts 14 to 24 are in pressure contact with the tool 126, while the axial faces 38 to 48, on the one hand, are protruding from the collet chuck 10 and, on the other hand, are facing the interior of the tool 126. The clamping parts 14 to 24 which are in the form of lamellas are disposed in radially extending receiving cutouts 92 to 102 of the collet body 12. There is also a pull member 156 provided which is connectable to the collet body 12 in an operating manner. The mandrel 104 narrows in the direction of its free end. The clamping parts 14 to 24 in the form of lamellas are of an approximately rectangular cross-section when viewed in a radial direction. The receiving cutouts 92 to 102 have widened portions that surround the clamping parts 14 to 24. The widened portions are filled with elastically deformable holding part 80 to 90 which connect the clamping parts 14 to 24 to the collet body 12. The widened portions ar filled with rubber or elastic material so that the holding parts 80 to 90 force the clamping parts 14 to 24 radially inwardly.

The receiving cutouts 92 to 102 are open towards the interior of the collet body 12. The clamping parts 14 to 24 are connectable to the collet body 12 via coupling elements. These coupling elements comprise radially extending cogs 142 at the clamping parts 14 to 24 and recesses 140 at the collet body 12, into which the cogs 142 engage. The recesses 140 are shaped in the form of a radially inwardly open annular groove, into which the cogs 142 are introduced. The clamping parts 14 to 24 are fixedly held in place by the holding parts 80 to 90. In order to avoid undesirable influence on the exactness of the adjustment of the clamping device due to the insertion of the cogs 142 into the recesses 140, the radial depth of the recesses 140 is adapted to the operating range of the clamping parts 14 to 24.

Figure 3:
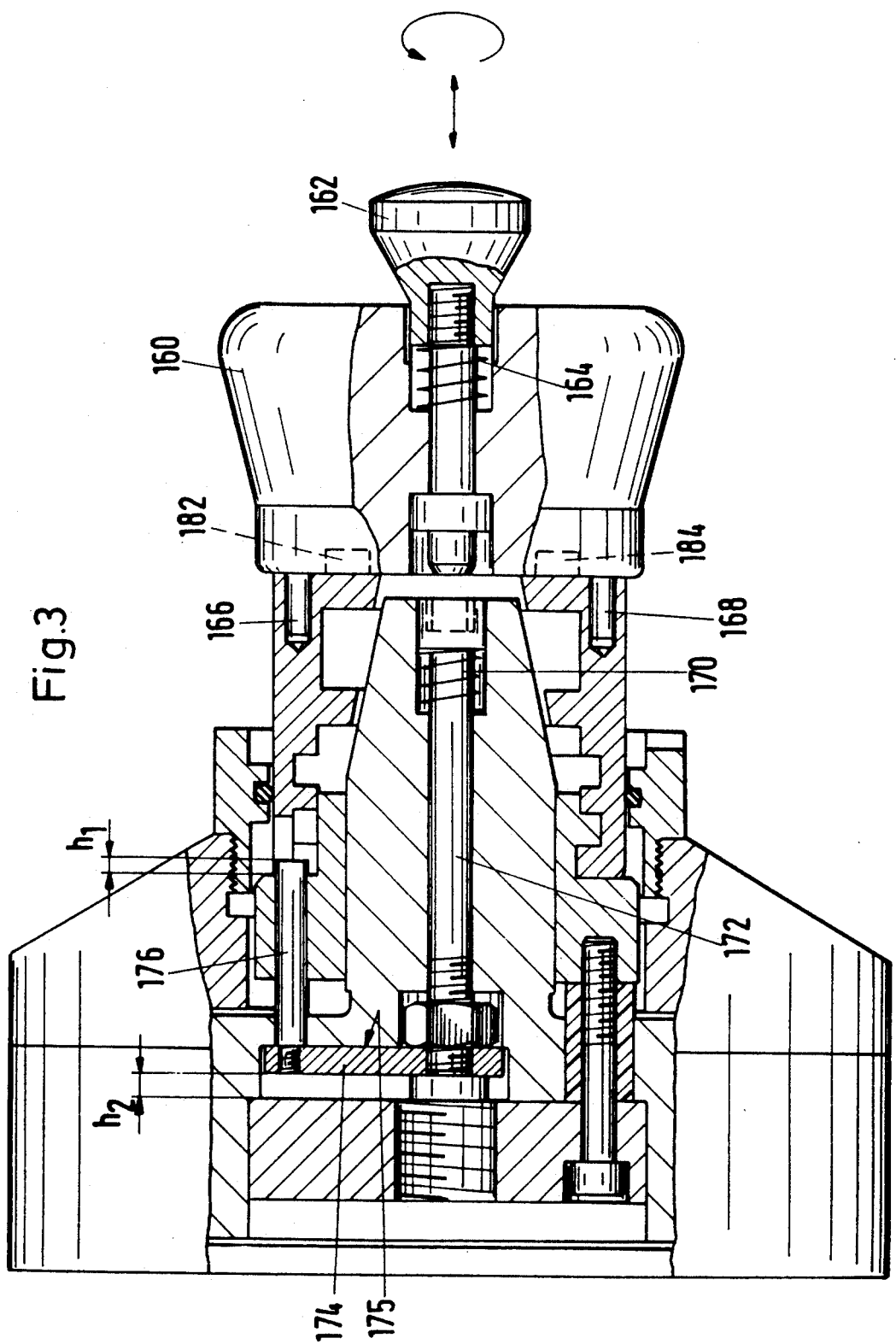
FIG. 3 shows the spindle head of FIG. 2 with an unlocking device.
Figure 4:
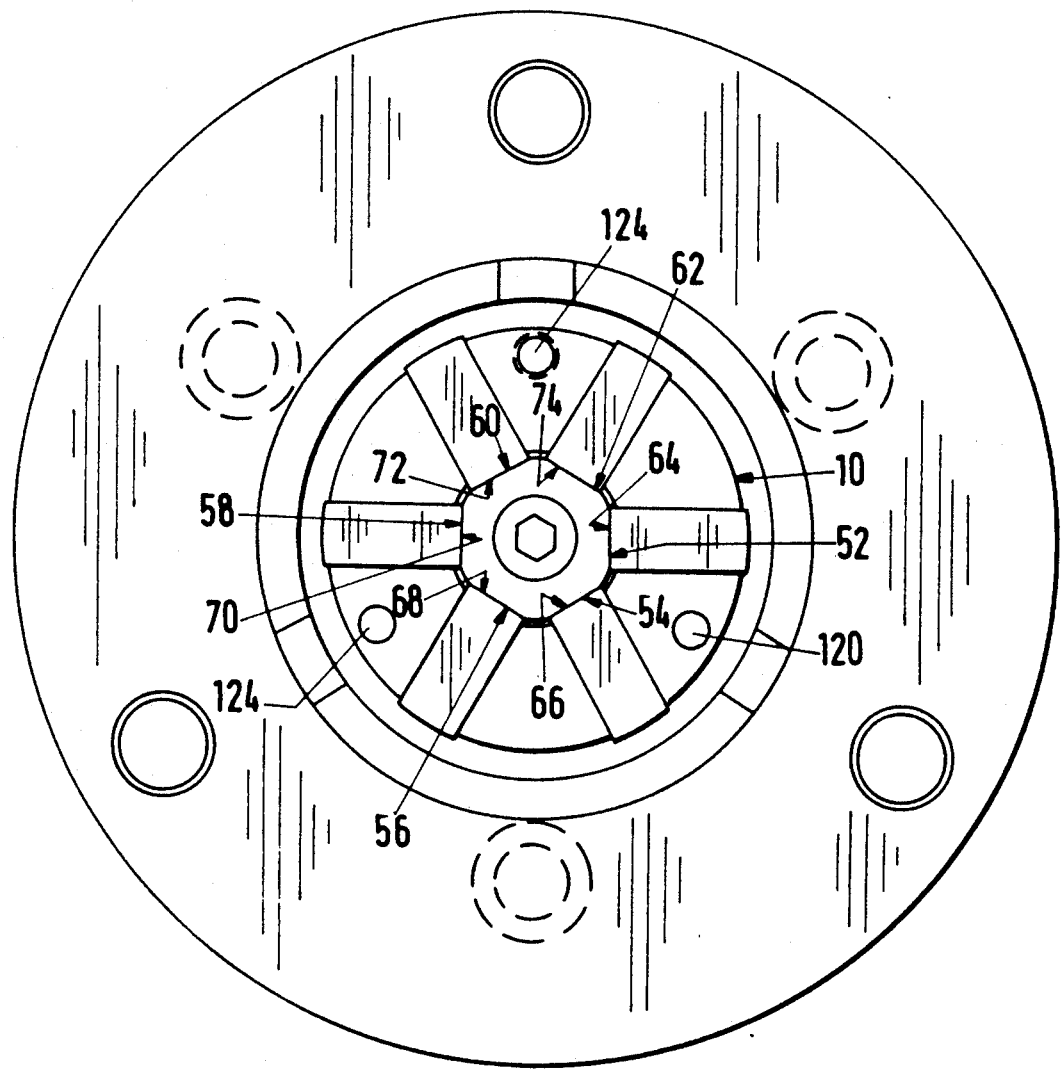
FIG. 4 is an axial end view of the spindle head represented in FIG. 2.
Figure 5:
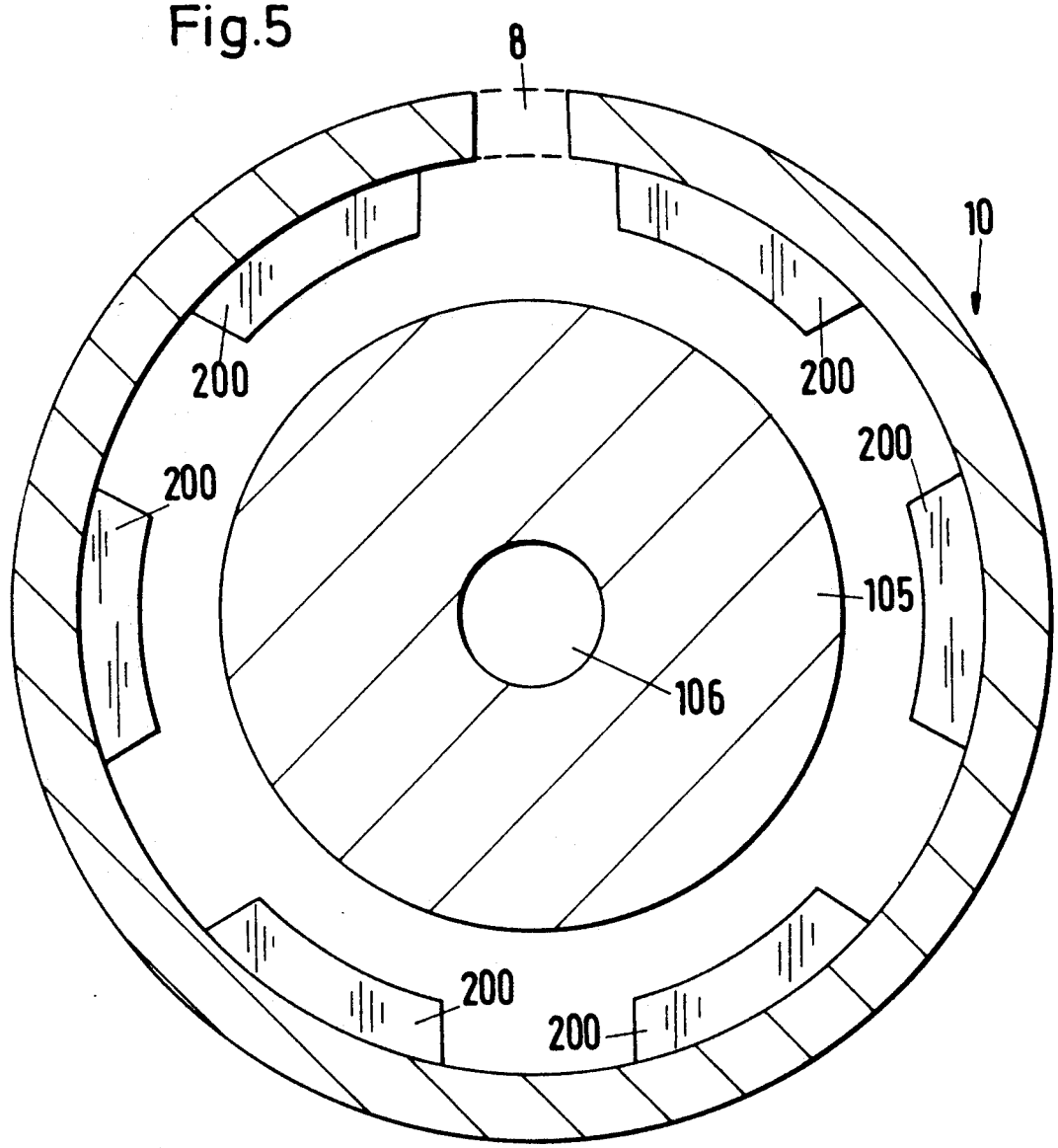
FIG. 5 shows a cross-sectional view along the lines V—V of FIG. 2.

The collet chuck 10 also comprises a radial groove 144 defined by radial projections 200 and 202. The radial groove 144 cooperates with the radial projections 204 of the pull member 156. The projections 204 and 202 form a bayonet locking device which may be disengaged by rotating the collet chuck 10 to the left or to the right. During rotation, the radial projections 204 of the pull member 156 are arranged between the recesses of the projections 202 so that the collet chuck 10 may be pulled to the right relative to the axial direction (FIG. 2). An accidental unlocking of the collet chuck 10 is therefore impossible, since during rotation the counter guiding surfaces 52 to 62 are cooperating with the curved sections of the mandrel 104. The clamping parts 14–24 which are held by the holding parts 80 to 90 are thereby forced in a radially outwardly direction, whereby a certain force stemming from the holding parts 80 to 90 must be overcome. This radial displacement, however, relates to a force, which may be overcome by an unlocking device 160 (FIG. 3). The mandrel 104 is provided with an axial bore 106 which communicates with a radial cutout 175. In the bore 106 and the cutout 175 an actuating mechanism 172, 174 is disposed. It comprises an axial pin 172 which is fixedly connected to a body portion 174. A catch 176 is connected to the body portion 174 whereby the catch 176 in its operating position engages the collet chuck 10 via its catching cutout 8, thus ensuring, that the collet chuck 10 remains in its operating position. The actuating mechanism 172, 174 cooperates with a pressure spring 170 which holds the catch 176 in the catching cutout 8. The actuating mechanism 172, 174 has a working stroke $h_2$, which is greater than the unlocking stroke $h_1$ that corresponds to the depth of the catching cutout 8.

The unlocking device 160 has an axially extending bolt 162 which engages the bore 106. Via the bolt 162, the actuating mechanism 172, 174 may be axially moved to the left. The bolt 162 cooperates with a spring which forces the bolt to the right (FIG. 3). The face of the collet chuck 10 is provided with three bores 120, 122 and 124, into which holding members or pins 166 and 168 of the unlocking device 160 are inserted. The pins allow for the exact positioning of the unlocking device with respect to the collet chuck 10. Holding elements 182 and 184, for example, magnets, are also provided which ensure that the unlocking device 160 is held in position at the clamping device 10. The spindle head 152 is connected to a base body 158 via screws 154. The base body 158 is provided with bores for screws 150. The screws 150 ensure a fixed connection between the pull member 156 and the bayonet locking device of the pull member. The stroke d of the pull member is determined such that the clamping parts may be moved in and out, within a maximum range.

The stroke $d_1$ is determined such that, when moving the collet chuck outwardly, the clamping parts 14 to 24 are not in a pressure connection with the tool 126. The collet chuck 10 is essentially a hollow cylindrical body with a side facing the mandrel 104 serving as the receiving portion for the mandrel 104. The opposite side is provided with slot-like recesses, in which the clamping parts 14 to 24 are radially disposed. The axial faces 38 to 48 of the clamping parts 14 to 24 may protrude from the face of the collet chuck 10 so that it is possible to hold tools with minimal axial recesses. All parts of the collet chuck may be manufactured with great precision so that the centering of the tool may be accomplished with greater exactness as is possible with conventional collet chucks.

The abutment 128 which is connected to the spindle head 152 in a detachable manner serves to determine the depth of insertion of the tool 126.

The present invention is, of course, in no way restricted to the specific disclosure of the specification and drawings, but also encompasses any modifications within the scope of the appended claims.

What I claim is:

1. An expansive collet chuck body comprising:
   a collet body having radially extending receiving cutouts, that extend in an axial direction, and further having an annular recess;
   a plurality of radially extending clamping parts with respective planar counter guiding surfaces, said clamping parts being inserted into said receiving cutouts;
a central mandrel having a substantially regular polygonal cross-section and being provided with flat guiding surfaces, said guiding surfaces resting at and within said counter guiding surfaces of said clamping parts;
a pull member for being connected to said collet body, with said clamping parts for being reciprocally axially displaceable by said pull member to thereby achieve a radial clamping action between said guiding surfaces and said counter guiding surfaces;
a means provided at said pull-member and said collet body for quick-releasing a connection between said pull member and said collet body;
a radially extending cog provided at each one of said clamping parts, each said radially extending cog engaging said annular recess to axially couple said collet body and said clamping parts; and
a means for preventing rotational displacement of said collet body relative to said mandrel comprising a catching cutout provided at said collet body and a catch provided at a spindle head, said catching cutout, in an operational position of said collet body, engaging said catch.

2. An expansive collet chuck according to claim 1, wherein said means for preventing rotational displacement comprises an actuating pin, that is connected with a first end thereof to said catch, and a spring, that is connected to a second end of said actuating pin so that said actuating pin is slidable against a force of said spring, with said actuating pin and said spring being arranged in an axial bore of said mandrel.

3. An expansive collet chuck body according to claim 1, further comprising an unlocking device for unlocking said means for preventing rotational displacement and for rotating said collet body, said unlocking device comprising a bolt and at least one pin, with said bolt and said pin inserted into a face of said collet body.

4. An expansive collet chuck body according to claim 1, wherein said clamping parts are provided with elastic holding parts that engage widened portions of said receiving cutouts of said collet body and load said clamping parts in a radially inward direction.

5. An expansive collet chuck body according to claim 1, wherein said quick-release means comprises first radial projections, provided at said pull member and spaced at a distance from one another about a circumference of said pull member, and second radial projections at said collet body engaging said first radial projections of said pull member in the manner of a bayonet locking device, whereby said quick-release means is released by turning said collet body about a given angle of rotation relative to said pull member.

* * * * *

UNITED STATES PATENT AND TRADEMARK OFFICE
CERTIFICATE OF CORRECTION

PATENT NO.   :   5,133,565
DATED        :   July 28, 1992
INVENTOR(S)  :   Claus Schmidt It is certified that error appears in the above-identified patent and that said Letters Patent is hereby corrected as shown below:

On the title page, item:
 [54]   EXPANDING COLLET CHUCK

Signed and Sealed this

Seventh Day of September, 1993

Attest:

BRUCE LEHMAN

Attesting Officer

Commissioner of Patents and Trademarks